United States Patent
Benson et al.

(10) Patent No.: US 7,383,193 B2
(45) Date of Patent: Jun. 3, 2008

(54) MAIL SYSTEM USING PERSONALIZED STAMPS FOR ENHANCED SECURITY IN HANDLING MAIL

(76) Inventors: Joel W. Benson, 19 Westwood La., Lincolnshire, IL (US) 60069; Zachary K. Benson, 19 Westwood La., Lincolnshire, IL (US) 60069

( * ) Notice: Subject to any disclaimer, the term of this patent is extended or adjusted under 35 U.S.C. 154(b) by 990 days.

(21) Appl. No.: 10/000,753

(22) Filed: Nov. 2, 2001

(65) Prior Publication Data

US 2003/0088426 A1    May 8, 2003

(51) Int. Cl.
*G06Q 30/00* (2006.01)
(52) U.S. Cl. .......................... 705/1; 705/401
(58) Field of Classification Search .................. 705/1, 705/400–410
See application file for complete search history.

(56) References Cited

U.S. PATENT DOCUMENTS

| | | | | |
|---|---|---|---|---|
| 5,819,240 | A * | 10/1998 | Kara ......................... | 705/408 |
| 5,953,426 | A * | 9/1999 | Windel et al. ............. | 380/51 |
| 6,035,290 | A * | 3/2000 | Pintsov ..................... | 705/405 |
| 6,765,490 | B2 * | 7/2004 | Lopez et al. .............. | 340/632 |
| 7,085,725 | B1 * | 8/2006 | Leon ......................... | 705/1 |
| 2001/0010334 | A1 * | 8/2001 | Park et al. ............... | 235/462.14 |
| 2003/0084007 | A1 * | 5/2003 | Brookner ................... | 705/408 |
| 2003/0130954 | A1 * | 7/2003 | Carr et al. ................ | 705/60 |
| 2003/0145192 | A1 * | 7/2003 | Turner ....................... | 713/1 |
| 2004/0211838 | A1 * | 10/2004 | O'Callaghan et al. ..... | 235/470 |
| 2004/0215581 | A1 * | 10/2004 | Lord et al. ................ | 705/400 |
| 2005/0058318 | A1 * | 3/2005 | Rhoads ...................... | 382/100 |

FOREIGN PATENT DOCUMENTS

| GB | 2316362 | * | 2/1998 |
|---|---|---|---|
| GB | 2 397 932 | * | 4/2004 |

OTHER PUBLICATIONS

U.S. Appl. No. 60/366,418 of patent 6,765,490.; Oct. 23, 2001.*
Hudgins, "Securing the Postal Front", National Review, pp. 1-3, Oct. 22, 2001.*

* cited by examiner

*Primary Examiner*—John W. Hayes
*Assistant Examiner*—Eric Liou
(74) *Attorney, Agent, or Firm*—John W. Benson (57) ABSTRACT

A mail system is implemented with secure stamps that are coded to identify the person who purchases the stamps. The system also defines a relative security risk for any such person and handles mail submitted by that person according to the defined risk. This system facilitates the identification of possibly hazardous mail and the persons who send such mail through the system.

21 Claims, 4 Drawing Sheets

MAIL SYSTEM USING PERSONALIZED STAMPS FOR ENHANCED SECURITY IN HANDLING MAIL

BACKGROUND OF THE INVENTION

1. Technical Field of the Invention

The invention concerns a secure mail system that minimizes the time and resources required to detect and treat toxic mail, and helps identify the terrorists who send such mail.

2. Description of Related Art

The United States is undergoing terrorist attacks on its infrastructure and institutions. One such attack involves anonymous mailing of harmful anthrax spores in envelopes addressed to members of the media and Congress. This bioterrorism is particularly insidious because it makes use of a postal system that has been trusted to deliver the nation's mail for generations.

Postal workers who handle this toxic mail have been contaminated and recipients of such mail have been infected, with deadly consequences. The Postmaster General has reported that there is no way known to ensure safe processing of mail in the United States. Also, the FBI and other law enforcement agencies have been unable to identify the persons who send toxic items in the mail. There is little evidence to support a search for such terrorists, because the open mail system of the United States can be used with relative anonymity.

It has been suggested that this present threat of bioterrorism may be addressed by either steam heating or irradiating each of the millions of envelopes and packages that pass through the system, thereby destroying any hazardous biological material.

While machines are available to provide such decontamination, they are very expensive and it may take considerable time to modify them for operation in handling mail. Given the huge volume of mail in the United States, it is doubtful that all such mail could be efficiently and reliably decontaminated without requiring substantial delays in delivery. Moreover, the decontamination process could destroy the contents of packages that are not harmful. Bio-decontamination also does not eliminate the threat of terrorism from explosive devices or hazardous chemicals sent through the mail. Moreover, the proposed decontamination processes will not assist in the identification and apprehension of the people who are responsible for this bioterrorism.

In attempting to deal with the terrorist threat, the Post Office has instructed the public not to open suspicious mail. For example, users of the postal system have been admonished not to open mail that is heavily taped, bears excess postage, or is addressed from a person whom the recipient does not know. Unfortunately, terrorists are also privy to these instructions and will no doubt modify their behavior to avoid the described characteristics of suspicious mail.

Under these circumstances, it is imperative that the United States and other countries with similar problems employ an improved mail processing system that not only discourages the mailing of hazardous substances but also assists law enforcement in identifying terrorists who engage in such activity and those who support them.

It is desirable to provide such an improved mail processing system that reliably identifies and isolates or treats only the relatively small volume of mail that has a high security risk. It is also desirable to implement such a system without requiring burdensome and expensive changes to the infrastructure of the postal system and unreasonable delays in the delivery of mail.

BRIEF SUMMARY OF THE INVENTION

The substantial advantages of a secure mail system can be achieved by changing the form of at least some stamps that are used in the system. The present U.S. postal system employs stamps that can easily be used anonymously to send toxic or other hazardous materials within the system. Substantially improved security can be obtained by using stamps that have a special access code that identifies the person who purchases and uses the stamp. At the point of purchase of such personalized stamps, the purchaser is identified by name or other characteristics and, based upon this information, is assigned an ID code that is printed on his stamps at the post office. The ID code identifies the purchaser in the event that the stamp is used with hazardous mail. A security risk code may also be placed on the stamp or accessed from a database created for the purchaser. The risk code determines the level of handling or decontamination that will be required to process mail with that person's stamp.

It is anticipated that most of the mail submitted to the postal system will contain personal stamps that indicate a relatively low security risk. Accordingly, mail with such stamps will not require any special security handling. On the other hand, the relatively low volume of mail provided with old style non-secure stamps or with secure stamps having an associated high risk, will receive special handling to detect hazardous substances or will be decontaminated to destroy any such substances.

If mail containing a hazardous substance is delivered with a low-risk security stamp, the access code on the stamp can be read to identify the person who purchased the stamp. That person can then be investigated to determine how his personal stamp came to be used in association with a hazardous material. Also, the mail system will be automatically alerted to segregate and not process any additional mail containing stamps from that person.

Increased security may be obtained by utilizing a fingerprint in association with the secure stamp, to demonstrate that the person identified by the stamp applied postage to the envelope or package in question. The substantial security benefits and advantages of the disclosed mail system will become apparent upon consideration of the following detailed description and accompanying drawings of presently preferred embodiments.

DETAILED DESCRIPTION OF PREFERRED EMBODIMENTS

The U.S. postal system is accessed by the use of stamps that display an engraved picture or emblem. These stamps are placed on an envelope or package that is then submitted anonymously for processing and delivery by the postal service. Recent events have demonstrated that terrorists can use this system with impunity to deliver hazardous biomaterials to unsuspecting recipients. The present postal system cannot identify the sender of such hazardous materials or determine the relative security risk of the millions of envelopes, packages or other items that are mailed each day. The U.S. postal system must therefore be modified in order to provide increased security.

Postal security can be greatly enhanced by changing the nature of the stamp that is used within the system. Greater postal security can be obtained if the postal system is modified to use secure stamps that are coded to identify the purchaser of the stamp. If this type of stamp is used to send hazardous materials through the mail, the purchaser of the stamp can be identified and located for questioning. Also, the security risk associated with any person who obtains such stamps can be evaluated and quantified at the point of purchase of the stamps. The relative security risk of the purchaser can be associated with the stamp, so that any mail provided with the stamp will receive special handling or treatment in the event of an identified high security risk. On the other hand, items of mail having stamps associated with a relatively low security risk will be handled with associated low security methods.

Figure 1:
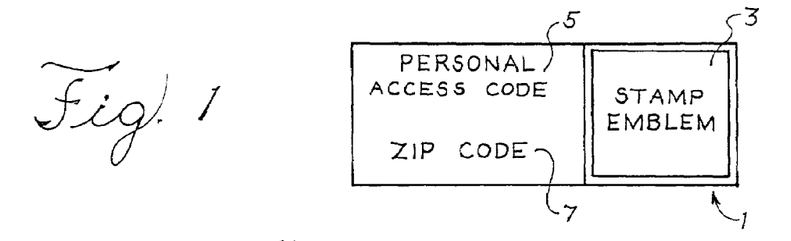
FIG. 1 is a diagrammatic illustration of a first embodiment of a secure stamp according to the invention.

A secure stamp according to the invention may be implemented in different ways to achieve increased security. The simplest implementation of a secure stamp is shown in the diagrammatic illustration of FIG. 1. As shown in FIG. 1, the secure stamp 1 has an engraved picture or emblem 3 that may be the same as has been used in the past. However, the stamp also includes at least an area 5 for an access code, identifying the purchaser of the stamp. An area 7 may also be used to display the zip code of the post office from which the stamp was purchased.

It should be understood that the physical structure of the secure stamp 1 of FIG. 1 may be implemented with an emblem 3 adjacent to the area having the access code and possibly the zip code, thus creating a relatively wide stamp. Alternatively, the access code could be printed on the face of the emblem 3 using invisible ink that fluoresces under a selected wavelength of light to display the access code. The access code could also be displayed in visually perceptible form in an open area of the emblem 3 of the stamp or displayed in this area by color coding, random dot color coding, holography or any other appropriate visual coding method. The zip code could also be displayed in an open area of the emblem of the stamp. If the access code and zip code are displayed on the emblem, the relative size of the secure stamp could be about the same as for stamps used in the past.

In use on an envelope or package, the secure stamp of FIG. 1 would be adhered in the usual manner, for example at the upper right corner. The secure stamp could be adhered by dampening a dry glue at the back of the stamp or the back of the stamp could have an adhesive that is adhered to a peelable backing (not shown) that is removed to allow the stamp to be adhered to a package or envelope.

The secure stamp of FIG. 1 is obtained by purchase from a post office anywhere in the United States. Such stamps would typically be provided for purchase in sheets. In order to purchase any such secure stamps, the purchaser would be required to provide identifying information such as a social security number and home address if the purchaser is obtaining the stamps for himself. If the purchaser is a representative of a business, he would provide the tax identification number of the business and either the local address or headquarters address of the business.

In order to enhance the security associated with the stamp, it is necessary for the postal employee obtaining the identifying information to use whatever reasonable methods are available to ensure that the purchaser is correctly identified. For example, a person could initially provide his social security number and the postal employee would use this number to access a government or other database to obtain the name and home address of the person. For example, it may be possible for the postal employee to access an Internal Revenue Service (IRS) database to obtain the name and address of the purchaser from tax information. This information would demonstrate that the purchaser has a valid tax record for the most recent tax year and may therefore present a relatively low security risk for the United States. Of course, other government or nongovernmental databases could be used to obtain similar information in order to develop a security risk profile for the individual.

After obtaining the name and address of the purchaser from a secure database, the postal employee would require him to submit independent evidence of his name and address, for example as occurs on a driver's license. If the individual submits a driver's license or other documentation to confirm his name and address, he has demonstrated that he likely presents a relatively low security risk for the postal system. In that case he would be allowed to purchase secure stamps that are associated with a low security risk.

In the case of the secure stamp of FIG. 1, the low security risk of the purchasing individual may be indicated by the color of the stamp. As an example, a green colored stamp could be provided to indicate a low risk purchaser. After confirming the low risk profile of the purchaser, the postal employee would select as many sheets of low risk security stamps as are requested for purchase. If required, the postal employee would create a computer record for the individual to provide security information in order to locate him if necessary and to facilitate the future purchase of stamps.

The purchaser's social security number or some other ID number assigned by the post office would be used as an access identifier for the computer security record, if it is created. Thus, any information entered into the person's record would be obtained or accessed by use of his social security or other ID number. In a relatively simple postal security system, the record for the purchaser would contain only his social security number or other postal ID for access purposes, his name and his home address. If a special record is not created, other existing databases could be relied upon to obtain at least the name and address of the person associated with the ID number.

Of course, other personal information could be obtained from the purchaser for his record. For example, a digital photograph could be taken of the purchaser and stored in his record the first time he purchases secure stamps. Also, a fingerprint could be scanned from at least one finger, for example his index finger, and a digital representation of this fingerprint could be stored in his record in a manner that is known for fingerprint identification technologies presently in use. Also, a representation of the purchaser's retinal pattern could be stored. Once such a record is completed, the purchaser can return in the future and obtain additional secure stamps by merely having his eye or fingerprint scanned to confirm his identity. A postal employee could further verify his identity by checking his appearance against the stored digital photograph. Alternatively, if photos, fingerprints and retinal patterns are not used, the purchaser would again provide his social security number and driver's license for verification to obtain additional secure stamps.

Once the purchaser's identification is verified, the postal employee places the required sheets of secure stamps in a local printer and the printer prints the ID code, for example the social security number, of the purchaser at the access code area 5 of all stamps of the sheets. The zip code for the post office may also be printed in the area 7 of all such stamps. As a further security measure, the post office could send by mail or email a message to the address of the purchaser, confirming the purchase of secure stamps.

Prior to printing the social security or ID number in the access area 5, the print program may encrypt the number so that it can be decoded only by the postal service. This encrypted number could be printed on each of the stamps in the area 5. Alternatively, the encrypted number could be converted by the print program to a corresponding bar code and printed in the areas 5 of the stamps so that the access code on each stamp can be scanned and read by a barcode reader and decoded to obtain the ID number by use of decrypting information available to the postal service.

If the purchaser is a representative of a business entity, the same general procedure applies. However, a tax ID number for the entity is used instead of a social security number. Once the tax ID number and address of the entity are confirmed, in most instances the entity would be assigned the lowest level of security risk and the associated low level security color for the stamps, for example green, if color coding is used. In creating a record for the entity, the postal employee would also record the identifying information for the purchaser who represents the entity and this person would have to demonstrate his employment relationship, for example by supplying a check from the entity.

The postal service might also obtain the telephone number of the entity from a reliable database and call to confirm the identity of the individual who purchases the stamps for the entity. Arrangements may also be made to mail the stamps directly to the entity. A photograph and fingerprint or retinal pattern of the purchaser for the entity could also be recorded to provide a complete record of the purchase. The purchasing representative would also need to supply his name and home address which would be verified in the manner previously described for individual purchasers. This identification process could also be employed to provide metered or electronic stamps as well.

It should be appreciated that the initial purchase of stamps is not a trivial exercise if a database of purchasers must be created. Significant time may be required to set up a personal record for every person and entity who obtains stamps. However, once these records are created, it should be relatively easy for the person or entity to obtain stamps. It should also be understood that any such stamps must be maintained in a secure location and used only by the purchaser and his immediate family or business.

If a representative of an entity approaches the post office to obtain stamps and cannot provide the required tax ID number and associated supporting information, secure stamps will not be provided. However, if an individual approaches the post office and cannot provide a social security number, it is still possible that this person could obtain secure stamps. For example, the person could be a foreign national who has a valid visa or passport, but no social security number. If this is the case, pertinent information is taken and, if a check of a government database confirms that the passport or visa is valid and not expired, secure stamps can be provided.

In view of the status of the individual as a foreign national, a higher level of security risk may be associated with that individual. In a relatively simple security system, only two levels of risk for stamps would be identified, either low or high. Under such a simple system, foreign nationals could all be evaluated as high-risk individuals and given either non-secure high risk stamps such as are presently used or high risk secure stamps, possibly color coded, for example in red, to reflect a high security risk. As an alternative, foreign nationals from friendly countries could be designated with a relatively low security risk and nationals from unfriendly countries could be characterized with a higher security risk, with stamps colored or coded to reflect these different risks.

The post office must create access codes for foreign nationals if they are allowed to obtain secure stamps. As an example, the access code could be made up of the zip code of the post office and a number incremented for each successive individual who does not have a social security number. Other types of personal access codes could be used as well, based upon visa or passport numbers, for example.

In processing the mail, employees of the postal service will use low-level security procedures to handle mail having low-risk secure stamps. High-risk items will be separated for special handling. The designated level of risk will determine whether the special handling requires a physical inspection of any such items or decontamination of the items by heat or radiation as has been proposed.

It should be appreciated that an advantage of the proposed security system is that envelopes and packages designated low risk by their stamps do not require special handling or decontamination. Only envelopes and packages designated high-risk require special handling procedures. This greatly reduces the expense and time required to process the mail. In fact, the post office could guarantee that mail with low-risk secure stamps will have expedited processing and will reach a destination, on average, more quickly than mail with non-secure or high-risk stamps. The postal service could also charge substantially more for non-secure or high-risk secure stamps because it would be known that greater processing will be required for mail items having these stamps. This would help to offset the cost of the security system.

It should be understood that non-secure stamps such as are presently in use could continue to be used within the postal system as very high risk stamps. Any mail associated with such stamps would require decontamination and possibly other special handling in processing. There would be no way to determine from such stamps who purchased or used them. Although it is undesirable from a security standpoint to continue to use such old style stamps, there may be political reasons to continue to use them. These stamps can therefore be accommodated within the system of the invention if they are provided for use in the highest risk category.

The described system has the additional advantage that, in the event that a contaminated package or envelope is found, the secure stamp reveals by its access code the identity of the person who purchased the stamp. Even if this person is innocent, law enforcement personnel would at least be able to investigate and possibly determine how the secure stamp was obtained for use on a hazardous package. The post office could also use the access code associated with the dangerous stamp to implement high security processing of additional mail with stamps having that code.

A further advantage of the security system is obtained by checking the zip code in the area 7 of the stamp. In typical use of stamps, a person or entity generally mails items in the home zip code area in which the stamps are purchased. It is quite unusual for an innocent individual to obtain stamps in one zip code area and mail envelopes or packages with such stamps in another zip code area. Using stamps outside the zip code area of purchase could be deemed a suspicious activity that demonstrates an increased security risk. If this is the case, postal service employees can monitor the zip codes printed on the secure stamps of mail being processed and, if the zip code observed on the stamp does not match the zip code of the processing post office, the mail item can be deemed a security risk and grouped with high risk mail, even if the secure stamp on the item is designated as low-risk.

The zip code in the area 7 of the security stamp 1 of FIG. 1 could be presented in barcode form and automatically detected in processing at the post office to identify a suspicious item of mail. The suspicious envelope or package would be automatically routed for high-risk handling. Of course, sensors could also be employed to detect either the color or risk code of the stamps on mail in order to automatically route items for processing.

The stamp of FIG. 1 has the advantage that it may be implemented relatively quickly and inexpensively in the postal system. If speed of implementation and low cost is paramount, the security stamp of FIG. 1 could be used without color coding, without a zip code, and without creating an accessible computer record for purchasers. Instead, if a problem occurs, the access code which is a social security number or tax ID number for most individuals or entities could be used to access a preexisting government or nongovernmental database for the purpose of identifying the purchaser. In such a simple system, it may be decided that only persons with tax ID numbers or social security numbers can obtain secure stamps. If this is the case, risk coding would not be required, because everyone obtaining a secure stamp would have a low security risk. If it is decided to include low risk groups such as documented foreign nationals, an access code for such persons would be selected to correspond to access information available in government or nongovernmental databases.

For example, it may be possible to create an access code for a foreign national that corresponds to a visa or passport number or some other number maintained by the government or others to keep track of such individuals. If such a number is used, a separate postal service database would not need to be created, because the foreign national could be identified by accessing the existing government or nongovernmental database with the access code from the stamp.

Anyone who is not in the low risk group or who does not wish to be included in that group could obtain non-secure stamps such as are presently used. Of course, these stamps would require the highest level of decontamination and security checking.

The initiation of a new mail security system will be relatively easy if secure stamps are introduced, old style stamps continue in use, and if no special purchaser database is required. The increased security from such a system should have a very desirable effect on national morale, in that it will allow citizens to actively participate in securing the postal system by procedures that are not difficult to implement. The cost of new security processing procedures will also be fairly carried by only those persons who desire to use old style stamps to maintain anonymity in sending mail or by persons judged to have a high-risk profile.

In order to begin to use the security stamp of FIG. 1, the Federal Government of the United States could set a date by which present stamps cannot be used. Individuals would go to post offices to exchange their existing stamps for secure stamps and to purchase secure stamps in the manner previously described. All individuals and companies in the United States could be required to obtain the new secure stamps by a specified date in order to use the mail system. After that time the old style stamps could not be used in the postal system. Alternatively, the old stamps could continue to be used and secure stamps could be introduced as a preferred and low cost method to send mail during these difficult times.

Figure 2:
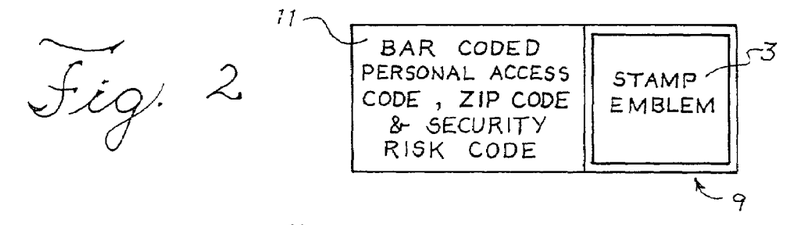
FIG. 2 is a diagrammatic illustration of a second embodiment of the secure stamp according to the invention.

FIG. 2 illustrates another embodiment 9 of a security stamp that could be used in a more elaborate mail system. This stamp has the emblem 3 that has been previously described and an area 11 that provides encrypted and bar coded information that is machine readable at the post office during processing of mail. The access code for the stamp of FIG. 2 is the same as was described with respect to the stamp of FIG. 1. Instead of color-coding the stamp of FIG. 2 to indicate the determined level of risk, the risk is indicated by a risk code that numerically designates different levels of risk associated with the purchasers of secure stamps. The zip code for the post office at the point of purchase is provided in order to determine if the stamp is used outside the zip code area of the post office where it was purchased. The risk code and zip code are used as previously described to manage the handling of mail associated with the stamp in accordance with the detected level of risk.

The stamp of FIG. 2 may include a stamp series code that is generated at the point of purchase. This code is provided on the stamp so that, if stamps of a particular purchase series are lost or stolen, a note to this effect can be made in the purchaser's record and, if the stamps are then used, the processing post office will access the record of the purchaser and note that the stamps have been lost. The mail with such stamps will then be segregated, inspected and decontaminated. Any such mail would not be forwarded by the post office. It would be treated with the highest level of security in view of the use of stamps that have been lost or stolen.

The stamp series can be coded in any desirable fashion. For example, each stamp purchase transaction of a particular purchaser could be numbered sequentially and the number would be stored in the personal record of the purchaser. Thus, all stamps obtained in a first purchase would have a stamp series number of "1". Stamps obtained in a second purchase would have a stamp series number of "2", and so on. In the normal processing of mail with such stamps, the stamp series would be read from the stamp and would be automatically compared by computer with the active stamp series listed in the purchaser's record. For example, if a stamp series number "2" is read from the stamp, the purchaser's record would be checked to verify that the corresponding stamp series is listed as an active series.

If a purchaser calls the post office and advises that stamps have been lost or stolen, a representative of the post office will access the record of the purchaser and will delete all active series stamps for that purchaser. If the lost stamps are later used, for example by a terrorist, the post office will receive the associated package, read the stamp series from the secure stamp and check the personal record of the purchaser to determine if that series is listed as active in his record. If the series was previously deleted from the record, there can be no series match and the mail would therefore be automatically directed to a high security area for careful inspection and decontamination. At some point any such mail would be opened because it would not be recognized as lawful.

The stamp series could also be coded as the date on which a set of stamps is purchased. That date code could be retained in the purchaser's record and modified, for example with an "L" designation, to indicate that the particular series was reported lost or stolen. Also, the post office may wish to issue secure stamps with a limited life, for example one year. If this is the case, a stamp series would be given a designation "E" after a one-year period and stamps in that series could not be used thereafter to process mail.

The stamp series code could also consist of the date in combination with the number of stamps that were purchased on that date. Each time a stamp is used, the number of stamps available for that series could be decremented. By this means, the post office could keep track of the number of purchased stamps that are used. A code could also be applied to the stamp series to determine the level of security risk for that series. This could be a significant feature if a purchaser's level of security risk changes over time.

The nationwide implementation of an analysis of stamp series codes would generally be possible only if there is a national database for all secure stamps in the United States. This would require a substantial computer infrastructure. In the absence of such a national system, local post offices could use computers of modest power to record only the stamp transactions in their office. In such a local system, it might be necessary to limit the use of secure stamps to the zip code area of purchase.

It should be understood that the access code, risk code, zip code and stamp series of the secure stamp of FIG. 2 could be combined in series to provide a single number that would then be encrypted and bar coded for automatic reading in the post office as the stamp is processed on a package or envelope. This processing would require some relatively sophisticated computer analysis which would occur in real time as the stamp is scanned and its associated package is being processed within the post office.

If the stamp series code is left off of the stamp of FIG. 2, the stamp can be processed without accessing a purchaser database. Thus, the risk code and zip code would be read from the stamp and processing in the post office would occur as indicated for the level of risk defined by these codes. The access code would not be required for processing, because there would be no need to identify the purchaser. The stamp of FIG. 2, without the stamp series code, could therefore be relatively easily processed by bar code reading the data on the stamp and then handling the associated mail in a manner defined by the codes on the stamp.

Figure 3:
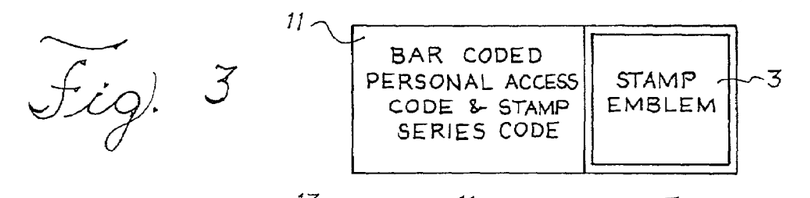
FIG. 3 is a diagrammatic illustration of a third embodiment of the secure stamp according to the invention.

FIG. 3 illustrates a third embodiment of a security stamp that operates with only the access code and stamp series printed on the stamp. The access code and stamp series are encrypted and bar coded so that they are read by a bar code reader at the time that the stamp is processed in the post office with its associated package or envelope. In this case, the access code must be used to read the associated record of the purchasing individual in order to obtain a risk code and a zip code that corresponds to the post office where the stamp was purchased. This operation has the advantage of reducing the amount of coded information that is provided on the security stamp. However, it has the disadvantage that processing of the stamp requires accessing the purchaser's personal database in order to get required processing information.

If processing of the stamp in the post office requires accessing the personal account of the purchaser, the system can keep track of the number of mailings that occur outside the home zip code of the purchaser. Thus, whenever a stamp is detected in the postal system in a zip code area different from the home zip code area, a number representing activity outside the home zip code area would be incremented. If this number reaches some trigger level, mail processed outside the home zip code area could be provided automatically with an increased higher level of risk. Also, a warning message could be sent to the post office to investigate the reason why the individual or entity is purchasing stamps in one zip code area and using the stamps to mail items in another zip code area.

If the personal record of the stamp purchaser is accessed during processing of the stamp on a package or envelope in the post office, it may be useful to provide additional personal information regarding the purchaser in the record. For example, entries could be made in the personal record to indicate if the purchaser fits a terrorist profile or has a change in his visa or passport status. This information would be accessed whenever the person comes into a post office to obtain additional secure stamps and, if the available information in his personal record indicates a substantial increased security risk, the post office may elect not to provide stamps to him or to provide stamps with a higher level of risk.

Figures 4, 5:
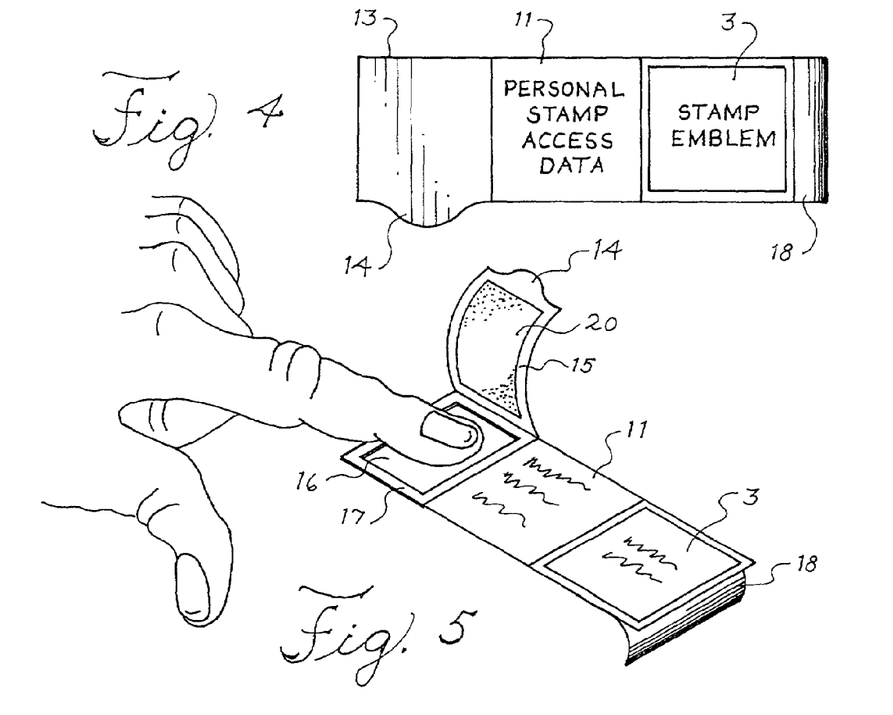
FIG. 4 is a diagrammatic illustration of a fourth embodiment of a secure stamp according to the invention.
FIG. 5 is a perspective illustration of the secure stamp of FIGS. 1-4 receiving an imprint from a finger of a user.

FIG. 4 illustrates another embodiment of the secure stamp that includes an additional area 13 that applies the purchaser's fingerprint to an envelope after he adheres a secure stamp to the envelope. As shown in the perspective illustration of FIG. 5, a plastic seal 15 is adhered to an underlying relatively rigid "picture frame" made of, for example stiff paper or cardboard. The air space 16 within the picture frame is backed by a peelable wax paper or plastic 18 that is adhered to the back of the frame and the backs of the areas 3 and 11 of the stamp. The paper 18 is peeled away from the areas 3,11 and the frame 17. The areas 3 and 11 of the stamp have an adhesive backing and are pressed and adhered to the surface of mail, for example an envelope. The area 16 within the frame 17 is then backed by the surface of the envelope as the frame rests on the envelope. The front seal 15 of the frame is peeled back by a tab 14 to expose its inside surface 20 that holds a washable ink and thus forms an "ink pad". The ink in the area 20 has not dried out because it was previously sealed within the frame 17.

A finger is pressed against the ink 20 and then against the surface of the envelope within the frame 17, as shown in FIG. 5. The frame 17 therefore acts as a template to position the fingerprint. Thereafter, the seal 15 and frame 17 are ripped away, for example along a line of perforations, and the fingerprint is exposed on the envelope adjacent to the associated secure stamp.

Alternatively, the frame 17 may be ripped away from the adjacent edge of the area 11 of the stamp along a line of perforations just before the peelable backing is removed from the stamp. The peelable backing is then removed and the stamp is adhered to the surface of the envelope. In this case the plastic backing on the frame 17 is retained and is not removed so that the frame 17 is, in effect, an ink reservoir into which the finger is pressed when the top seal 15 is removed. The fingerprint is then applied to the envelope adjacent to the stamp without requiring a template to align the print. It should be appreciated that a frame support is not required in this alternative embodiment. A sheet of plastic, cardboard or stiff paper impermeable to ink could also be used.

A fingerprint could also be applied to an envelope in any other manner that is desired. For example, the user could purchase and use an inkpad in the usual manner to apply his fingerprints adjacent to secure stamps. In this case, it would not be necessary to include a source of ink for each stamp.

The fingerprint on the envelope could either be visible to the unaided human eye or visible in the presence of appropriate radiation, depending on the ink that is used. In processing a security stamp with a fingerprint, the fingerprint would be scanned to obtain a digital representation and this would be compared with a stored digital representation of the fingerprint of the purchaser of the stamp. If there is a match, this would significantly reduce the security risk associated with the stamp, because it would be inferred that the purchaser of the stamp applied the stamp to the package or envelope. This is an additional form of security verification that could be used to ensure that the purchaser of the security stamp actually uses the stamp.

It should be understood that at least the emblem of secure stamps will be cancelled with some appropriate marking as the stamps are processed within the post office. The cancellation marks will ensure that the stamps cannot be reused. Also, non-secure stamps may be used to add postage to secure stamps, because only one secure stamp is required for each item of mail.

As a further point of information, the security of the post office system would be enhanced if, when a person moves, his new address is entered in his personal record and stamps issued before the move are cancelled, for example by applying an expiration code in his record. New stamps could then be purchased with the new home zip code of the purchaser.

Figure 6:
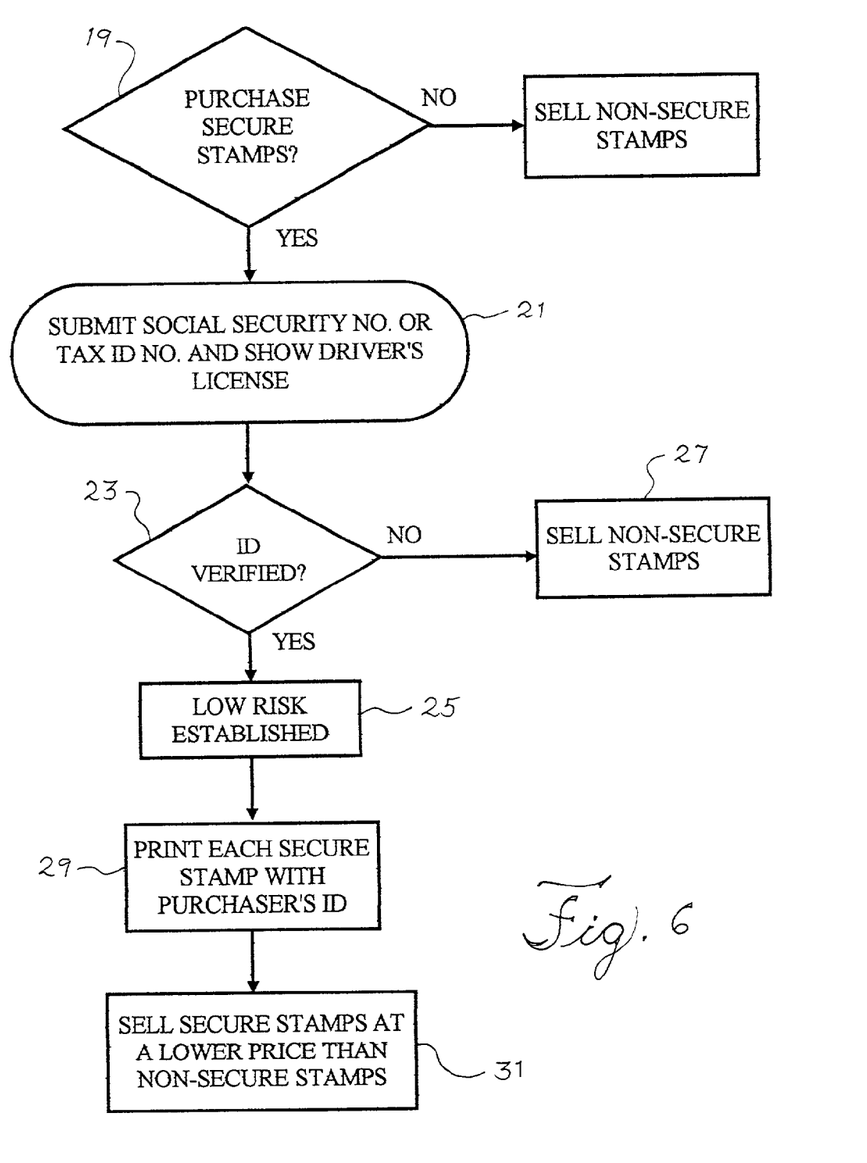
FIG. 6 is a block diagram of process steps for implementing the purchase of secure stamps for a relatively simple security system.

FIG. 6 illustrates a block diagram of the operational steps that are required to obtain secure stamps in the simplest security system. As indicated at 19, the purchaser decides whether to purchase secure stamps or non-secure stamps of the type presently employed by the postal system. If secure stamps are required at 21, the purchaser presents his social security number, or a tax ID number if he represents an entity. The post office then accesses a database, for example an IRS database, and obtains the name and home address of the purchaser. The purchaser presents a driver's license or other evidence to verify his name and home address. If there is an address match, the social security number or tax ID is verified at 23 and assigned as the low risk access code at 25 for the individual or entity obtaining stamps. If the ID cannot be verified, the person may purchase non-secure stamps at 27.

The verified ID is printed at 29 on secure stamps having any desired color. The ID may be encrypted and converted to a machine readable bar code before it is printed on the stamps. The secure stamps may then be sold at a lower price than the non-secure stamps at 31.

Figure 7:
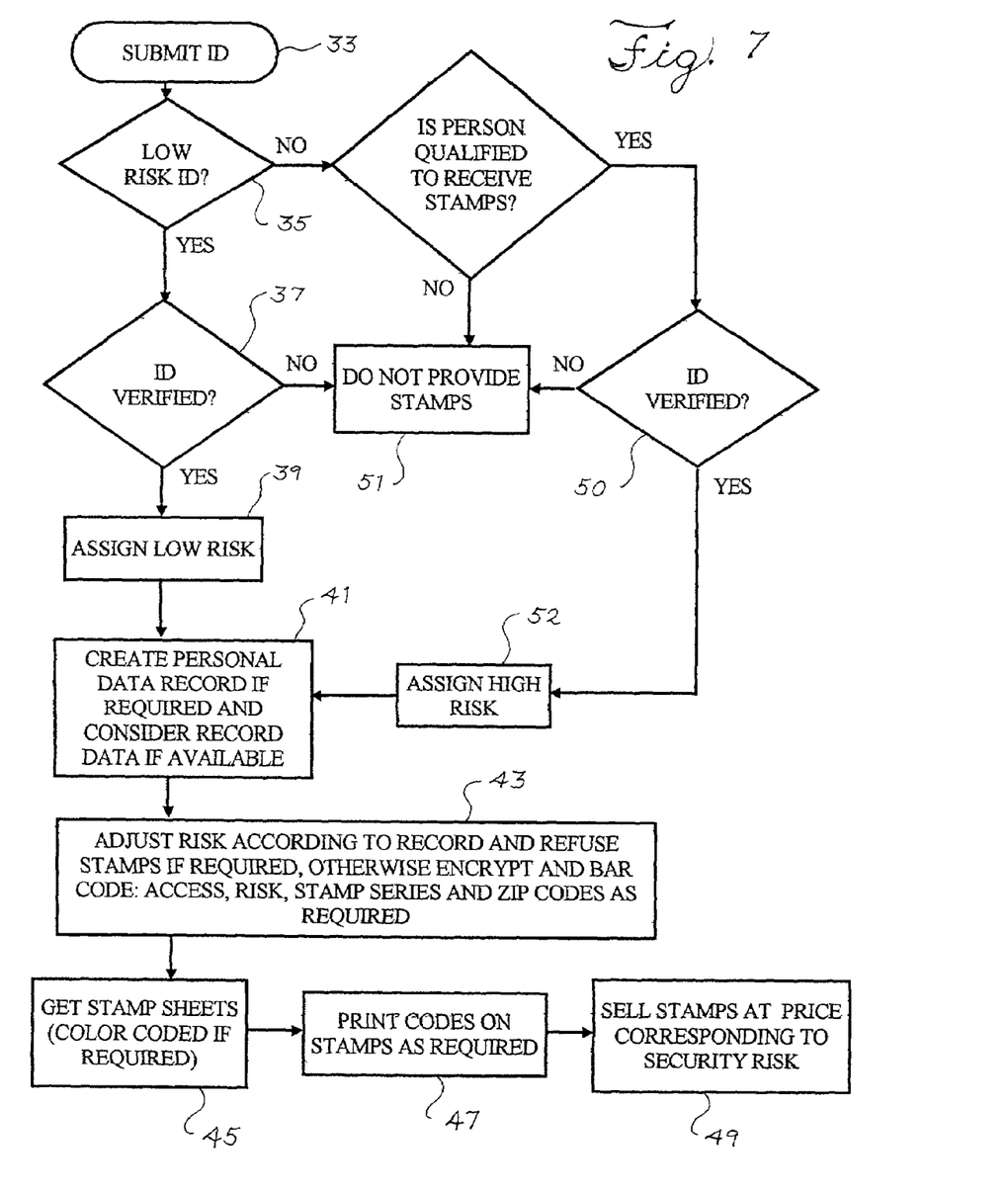
FIG. 7 is a block diagram of a more comprehensive system for implementing the purchase of secure stamps.

FIG. 7 illustrates a block diagram of the steps required to obtain secure stamps in a somewhat more complex postal system. The purchaser ID is submitted at 33 and may be detected as a low risk ID at 35 and verified at 37 as previously described. If verified, a low risk is assigned at 39. At 41, other personal or business data may be taken, including a digital photo and fingerprint or retinal scan of the purchaser. At 41, a personal digital record is created with the required information and this record is accessed by the assigned access code that identifies the purchaser.

The personal or business data is then analyzed, for example in accordance with a computer program, and the level of security risk for the individual or entity is set and recorded as the final determination of the risk at 43. If necessary, the program automatically encrypts and bar codes the access code and other codes including the risk, stamp series and zip codes and determines at 45 if the security risk is to be indicated with a designated color for a stamp.

If color-coding is desired, sheets of stamps having a color corresponding to the risk code are selected at 45. On the other hand, if color-coding is not required, secure stamps of any desired color are selected for printing. The required codes are printed on the stamps at 47. Thereafter, at 49 the purchaser may be required to pay a purchase price for stamps in proportion to the security risk. That is, the higher security risk stamps may cost more money, because additional postal handling will be required when these stamps are used.

As shown in FIG. 7, if the purchaser cannot provide the required ID, if the ID information cannot be verified, or if the purchaser is not qualified to receive secure stamps, he will be denied secure stamps at 51. Otherwise, as previously described, he may purchase high-risk stamps at 50, if this is allowed. These stamps will be assigned a high-risk code at 52.

Figure 8:
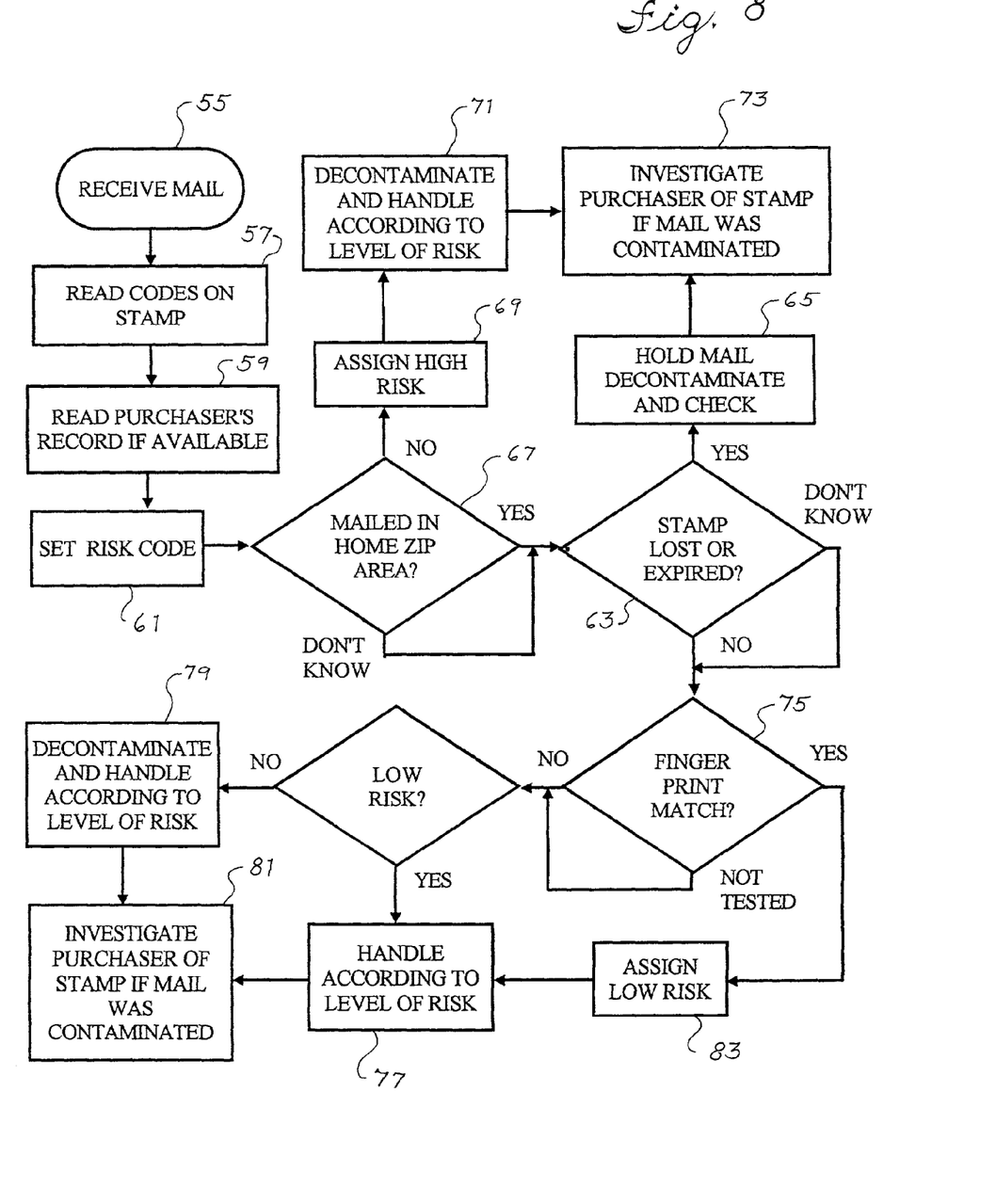
FIG. 8 is a block diagram of the process steps required within the postal system to evaluate the relative risk associated with a particular stamp, provide appropriate handling of the associated mail item, and enable identification of the person associated with the stamp if there is any problem.

FIG. 8 is a block diagram that shows the steps for processing secure mail within a post office. As shown at 55, the mail is initially received for processing and at 57 the access code and the color or printed risk codes, if any, of the secure stamp are detected. If the stamp has no codes, it is assumed to be non-secure at the highest level of risk. If it has an access code, but no other codes, it is assumed to have a low security risk. If available, the purchaser's personal file is read at 59 to obtain more information regarding the security risk associated with him and at 61 the risk code is set.

A computer program checks at 67 to determine if the mail was mailed outside the home zip code area. If so, a high-risk code is assigned to the mail item at 69 and the item is decontaminated and handled at 71 according to its high-risk code. A count may also be incremented and stored in the purchaser's record to keep track of the number of mailings outside the home zip code area. The purchaser may be investigated if this count exceeds a designated value. If there is a lost stamp code recorded for this particular scanned stamp, or if the stamp is stolen or expired, the mail will be automatically routed at 63 to be held for hazardous substance checking, decontamination and treatment based on insufficient postage at 65. Of course, if the mail contains hazardous material, the purchaser of the stamp is investigated at 73.

If the item was mailed in its home zip code area and the stamp is not designated lost, stolen or expired, then the risk code assigned at 61 is not changed and the program next checks at 75 to determine if a fingerprint is present on the stamp. If a fingerprint is not present or is not intended to be tested, the mail item is handled and processed according to the risk code that is determined from the stamp and from the purchaser's personal record, if it is available. That is, if the stamp is designated low risk, the associated mail is processed at 77 according to its level of risk. If the stamp is a higher risk, the associated mail is decontaminated and handled at 79 according to the high level of risk.

If a fingerprint is detected on the stamp, the fingerprint is compared at 75 to the fingerprint stored in the personal digital record of the purchaser of the stamp. If the fingerprints match, the risk code is set to indicate a low risk at 83 if this purchaser has previously provided a valid ID such as a social security or tax ID number. Thereafter, the mail item is handled and processed at 77 in the manner required by the low risk code. The purchaser is investigated at 81 if his stamp is associated with hazardous materials.

It has been suggested that fine anthrax spores, on the order of 1 to 5 microns, may leak from envelopes as the envelopes move and are handled within the postal system. It is theorized that the tiny spores may actually pass through the relatively porous paper or leak through the seams of the envelope. If this is correct, the effectiveness of the proposed secure mail system may be decreased, because cross-contamination of mail might make it difficult to identify the original source of anthrax contamination. The system might therefore be degraded if low and high-risk items are unduly mingled in the process of sorting the mail. It is therefore preferred to separate the low and high-risk mail as soon as possible in the sorting process in order to avoid cross-contamination.

The secure mail system would also be enhanced if the government requires the nationwide use of envelopes that have a demonstrated ability to retain or block 1 to 5 micron particles of anthrax or any other such biomaterials during normal postal processing. If necessary, envelopes may be sealed with a chemical coating or lined with filter material that is known to block or even trap spores in the indicated size range. Spores in this size range must be secured so that they will not be inhaled by postal workers. Low friction and antistatic materials and coatings could also be used so that small bio-particles will not adhere to the outer surface of envelopes. Approved envelopes could be certified as safe and marked with an appropriate certification code that would be automatically verified by the postal service during initial processing of the mail. Any mail submitted in an envelope that is not approved by the postal service would be decontaminated and destroyed.

Variations and modifications of the disclosed embodiments of the security stamp and associated mail system may be made without departing from the scope of the invention. For example, the disclosed secure mail system may be implemented in countries other than the U.S. or for non-governmental mail delivery systems. The system is also not limited to the use of social security numbers or tax ID numbers for the access code. Any suitable identification may be used, for example, driver's license number, military identification number, visa number, passport number and identifiers assigned by the post office. Any reasonable system for verifying the identity of the purchaser may also be used.

The invention is also not limited to the disclosed types or combinations of codes or the types of information disclosed for storage in the personal record. Any suitable codes may be used and any suitable information may be stored and used in the stamp purchaser's personal record, including military status, arrest/conviction status, passport or visa status, terrorist profile comparisons, taxpayer status, country of citizenship, birth date and terrorist affiliations.

Also, the system is not limited to printing a personal access code on stamps as they are purchased. As an alternative, the stamps could be pre-printed with serial numbers identifying the stamps in a series or block of stamps. A single serial number could be used to identify each stamp of the entire block, or incremented serial numbers could be used to provide a unique identifier for each stamp within the block, whatever is required. The computer record of each purchaser would retain the serial numbers of all stamps that he purchases. His risk code from his personal record would apply to all such stamps in his record. The personal records of all purchasers could be computer searched to locate the serial number of a particular stamp, in order to identify the purchaser of that stamp. This system has the advantage that it does not require printing personal access ID's on stamps at the time they are purchased. However, it has the disadvantage that it requires a computer record to keep track of the purchases of each person or entity and a significant computer search to locate the purchaser of a particular stamp.

The computer search would be simplified if each serial number is used as an access code for a separate record created with or pointing to the associated purchaser's information. In this case, the serial number of a stamp or group of stamps could be used to access an associated record for the stamps and the purchaser would be identified from that record. This would simplify the process for identifying the purchaser of a particular stamp or group of stamps, but would require many more records in the postal service database. On balance, the previously described method of assigning and printing personal access codes on stamps is preferred because it can be implemented without requiring a purchaser database.

The aforementioned description is intended to be illustrative rather than limiting. It should therefore be understood that the following claims and their equivalents set forth the scope of the invention.

The invention claimed is:

1. A method for implementing a secure mail system comprising the steps of:

coding at least one stamp to make it secure;

associating the code of the stamp with a person or entity that purchases the stamp;

applying the purchased secure stamp to an item of mail;

delivering the stamped item of mail to the mail system;

obtaining the coded information from the stamp; and determining from the coded information, a level of risk for handling the stamped item of mail and an associated security procedure required to process the stamped item of mail in the mail system, wherein the procedure for handling mail with a higher level of risk requires additional processing steps for safety beyond what would be required to handle mail having a relatively lower level of risk.

2. The method of claim 1, wherein the step of determining further includes identifying the person or entity that purchased the stamp.

3. The method of claim 1, wherein the step of determining further includes obtaining a name and address of the person or entity that purchased the stamp.

4. The method of claim 1, further including the step of coding the stamp by providing a color for the stamp that corresponds to the security procedure.

5. The method of claim 1, further including the step of using the coded information to access a database that identifies the person or entity that purchased the stamp.

6. The method of claim 1, further including the step of defining the code from at least one of the group of numbers consisting of the stamp purchaser's social security number, driver's license number, military identification number, tax identification number, visa number, and passport number.

7. The method of claim 6, further including the step of defining the code by encrypting one or more selected numbers of the group characterizing the purchaser of the stamp and printing the encrypted information in machine-readable form on the stamp at the time of purchase.

8. The method of claim 1, further including the step of encrypting and printing the code on the stamp at the time the stamp is purchased.

9. The method of claim 1, further including the step of encrypting the level of risk in the form of a code and printing the code on the stamp in machine-readable form at the time the stamp is purchased.

10. The method of claim 1, further including the steps of maintaining a database of information identifying the purchaser of the stamp and modifying this database as required to reflect expiration of the purchased stamp; accessing the database when the stamp is detected in the mail system and handling the associated mail as required to reflect the expired condition of the stamp.

11. The method of claim 1, further including the steps of determining when mail with the secure stamp is presented for processing in the mail system outside a designated home area within which the stamp was purchased and handling the mail as required to reflect an increased security risk associated with mailing outside of the designated home area.

12. The method of claim 1, further including the steps of imprinting a machine-readable fingerprint of the purchaser of the stamp or a user of the stamp on the item of mail; comparing and validating the imprint against a stored representation of the purchaser's or user's fingerprint when the stamp is detected in the mail system; and adjusting the level of risk and associated security handling of mail with the stamp when the fingerprint is validated.

13. The method of claim 1, further including the steps of:
selling the secure stamps to the purchasers for one price;
selling non-secure stamps that do not identify the purchaser for a price greater than the one price; and
using the stamps to send mail through the mail system.

14. The method of claim 1, further including the steps of using in the mail system both secure stamps and non-secure stamps and decontaminating all mail having the non-secure stamps as such mail is processed in the mail system.

15. The method of claim 1, further including the steps of using in the mail system both secure stamps and non-secure stamps and processing mail with the non-secure stamps to either verify that such mail is not hazardous or to eliminate any hazard from such mail.

16. The method of claim 1, further including the steps of using in the mail system both secure stamps and non-secure stamps and guaranteeing a shorter delivery time for mail with the secure stamps than for mail with the non-secure stamps.

17. The method of claim 1, further including the step of:
sending a communication to at least one address of the purchaser to confirm the purchase of his secure stamps.

18. The method of claim 1, further including the step of:
identifying the secure stamps that are lost, stolen, or no longer secure and preventing mail with such stamps from being delivered by the mail system.

19. The method of claim 1, further including the steps of:
identifying the purchaser of the secure stamp when it is used to mail hazardous materials; and
investigating the purchaser of any such stamp to determine his negligence or fault in regard to the hazardous mailing.

20. The method of claim 1, further including the step of printing on the secure stamp information identifying the purchaser including a name or an image at the time the stamp is purchased.

21. The method of claim 1, further including the step of printing on the secure stamp a machine-readable code representing information including a name or an image identifying the purchaser at the time the stamp is purchased.

* * * * *